United States Patent [19]

Merzon

[11] Patent Number: 4,896,769

[45] Date of Patent: Jan. 30, 1990

[54] CODED STORAGE DISPLAY TRAY

[76] Inventor: Richard Merzon, 85 N. 3rd St., Brooklyn, N.Y. 11211

[21] Appl. No.: 194,829

[22] Filed: May 17, 1988

Related U.S. Application Data

[62] Division of Ser. No. 805,874, Dec. 6, 1985, Pat. No. 4,744,463.

[51] Int. Cl.$^4$ .......................................... B65D 85/672
[52] U.S. Cl. .................................... 206/232; 206/387; 312/9; 312/12
[58] Field of Search ............... 206/387, 449, 459, 493, 206/232; 312/8-19; 211/40

[56] References Cited

U.S. PATENT DOCUMENTS

| | | | |
|---|---|---|---|
| 611,136 | 9/1898 | Mason | 206/538 |
| 747,368 | 12/1903 | Boye | 206/459 |
| 920,462 | 5/1909 | Hinkle | 206/459 |
| 1,482,085 | 1/1924 | Marks | 206/459 |
| 2,102,971 | 12/1937 | Petremont | 206/459 |
| 2,130,762 | 9/1938 | Borden | 206/459 |
| 3,351,209 | 11/1967 | Kofoed et al. | 206/449 |
| 3,622,102 | 11/1971 | Fox | 206/387 |
| 3,674,132 | 7/1972 | Loss | 206/387 |
| 3,746,180 | 7/1973 | Spiroch et al. | 206/387 |
| 3,856,369 | 12/1974 | Commiant | 206/387 |
| 3,866,990 | 2/1975 | McRae | 312/15 |
| 4,121,877 | 10/1978 | Brown | 312/19 |
| 4,221,440 | 9/1980 | Morgan | 206/387 |
| 4,266,834 | 5/1981 | Ackeret | 206/387 |
| 4,518,084 | 5/1985 | Berkman | 206/493 |

FOREIGN PATENT DOCUMENTS

| | | | |
|---|---|---|---|
| 3200306 | 7/1983 | Fed. Rep. of Germany | 206/387 |
| 3325394 | 1/1985 | Fed. Rep. of Germany | 206/387 |
| 2107361 | 4/1983 | United Kingdom | 206/387 |

*Primary Examiner*—Jimmy G. Foster
*Attorney, Agent, or Firm*—Robert W. Fiddler

[57] ABSTRACT

A storage display tray for selectively retaining either or both a relatively small or relatively large rectangular in cross-section object. The tray is particularly suited for use in connection with tape cassettes having pinch roller openings along a longitudinal edge thereof and the relatively larger containers, such as boxes, for the cassettes so that either a cassette alone, or a boxed cassette may be selectively retained. The tray is formed of a plurality of elongate compartments defined by a longitudinally extending partition flange between each adjacent compartment. A laterally extending wall is provided spaced apart more than the length of a relatively larger object such as a boxed cassette. A bottom wall extends between the longitudinally and laterally extending walls and an engaging element is formed on the bottom wall to frictionally engage in the cassette pinch roller openings to grip the unboxed cassette. A rib on the laterally extending walls in each compartment is positioned to frictionally engage the ends of the relatively larger boxed cassette. Thus unboxed cassettes or boxed cassettes may be selectively held with little or no tray deformation. Each tray compartment is provided with either or both color and/or color tone coded and alpha numeric indicia, and correspondingly marked labels also color coded and/or color tone coded are provided for securement to the unboxed cassettes or boxed cassettes to be retained in the tray compartments.

4 Claims, 4 Drawing Sheets

CODED STORAGE DISPLAY TRAY

This application is a division, of application Ser. No. 805,874, filed 12/6/85, now U.S. Pat. No. 4,744,463.

This invention relates to the art of storage display trays, and more particularly to a tray suitable for supporting, displaying, and organizing box-like, rectangular in cross-section, objects such as tape cassettes which may be either boxed or unboxed, with the object engaged within the tray and subject to ready removal, replacement, and organization through the use of a three way, color coded, tone scaled, cross-numbered indexing system.

BACKGROUND OF THE INVENTION

A variety of trays for retaining and displaying objects of different sizes have long been known, and these trays have long been provided with compartments configured to the dimensions and contours of the object to be retained so as to securely maintain these objects in the tray.

With the advent of magnetic tape recording, both audio and video, and particularly with the widespread use of recording and playback apparatus in the home, a need has arisen for storing and organizing such tapes. These tapes are widely distributed in cassettes, with boxes provided for the cassettes. The typical user finds over a period of time that he has a number of boxed tape cassettes, and a number of unboxed tape cassettes, each of which it would be desirable to maintain and store for ready access and use. Further, in storing such cassettes it would be desirable to be able to organize the boxed and unboxed cassettes for ready access and replacement in the tray.

Thus Kryter in U.S. Pat. No. 3,756,383 developed a storage case formed with compartments defined by spaced horizontal and vertical ribs serving to accomodate therebetween either a boxed or unboxed cassette.

U.S. Pat. No. 4,432,453 disclosed another variation on the theme where a storage case is formed with compartments having ribs defining spaces in the compartment to accomodate either a boxed or unboxed cassette.

In utilizing the above described storage cases, the case insert or tray is formed of a resilient material such that the ribs defining the spaces accomodating the unboxed cassettes frictionally engage the surfaces of the unboxed cassette so as to resiliently retain same in the tray compartment. As a result of this frictional engagement, each rib is slightly displaced by the positioning of an unboxed cassette thereagainst, so that the empty compartments adjacent the filled compartments tend to become deformed, with the spacing between the walls of empty compartments adjacent the filled compartments being pushed into the unfilled compartment to reduce and inhibit its capacity to receive unboxed cassettes.

Additionally, these prior art trays make no provision for arranging the retained objects in desired groups and further create a problem when using the tray for the storage of unboxed cassettes because the identifying label located on the face of a cassette cannot be seen when the unboxed cassette is placed in the tray as conventionally with the cassette label blocked from view by an adjacent cassette. This requires the user to remove each unboxed cassette in order to read the label.

SUMMARY OF THE INVENTION

It is with the above considerations in mind, that the present improved storage and display tray has been evolved providing a compartmented tray in which by arrangement of the compartment partition walls in a given spaced orientation, along with the positioning ribs and engaging elements in the compartment, provision is made to selectively retain either or both of a relatively small rectangular in cross-section article such as an unboxed cassette, or a relatively large rectangular in cross-section object such as a boxed cassette without deformation of the compartment. Additionally by providing an index guide bearing indicia, and corresponding indicia on the compartments and the boxed or unboxed cassettes, organization of the cassette collection and removal and replacement in the tray in a readily identifiable position is facilitated.

It is accordingly among the primary objects of this invention to provide an improved storage display tray for selectively retaining and organizing either or both small or large box-like objects such as boxed and/or unboxed cassettes.

Another object of the invention is to provide a storage display tray which lends itself to positioning in a carrying case.

A further object of the invention is to provide a storage display tray for objects such as boxed and/or unboxed cassettes with the tray suitable for positioning in a storage cabinet.

Another object of the invention is to provide a storage display tray for boxed and/or unboxed cassettes which are frictionally engaged in the tray for storage but may readily be removed from the tray for use or replaced in the tray for storage without deformation of the compartment walls.

A further object of the invention is to provide means for organizing a collection of objects such as boxed and/or unboxed cassettes to facilitate maintaining them in an arrangement for ready access and replacement.

An additional object is to provide a tray in which frictional engagement of retained objects does not result in undesired tray deformation.

These and other objects of the invention which will become hereafter apparent are achieved by providing a tray with a plurality of elongate compartments separated by a longitudinally extending partition flange between each adjacent compartment, with the spacing between proximate surfaces of the partition flanges being greater than the thickness of a relatively large object to be retained such as a boxed cassette. Arranged within the compartment at each end therof is a rib, with the spacing between proximate facing surfaces of opposing ribs in each compartment being such as to frictionally engage the end walls of a relatively large object such as a boxed cassette to be retained. The compartments are further formed with engaging elements in each compartment extending into the cassette pinch roller openings to frictionally engage the unboxed cassette and positively prevent both lateral and transverse movement of the unboxed cassette. Additionally the compartments are either or both color coded, tone scaled, numbered or letter coded with different numbers and/or letters or numbers, and matching labels are provided for securement to the boxed and/or unboxed cassettes to be maintained in the correspondingly coded compartment or part thereof.

A feature of the invention resides in the fact that the compartment defining partition walls are not frictionally engaged by the boxed or unboxed cassettes so that there is no distortion of the walls into adjacent empty compartments.

Another feature of the invention resides in the provision of mating indexing indicia on the compartments and on the boxed and/or unboxed cassettes to facilitate organization of a collection of objects such as boxed and/or unboxed cassettes.

BRIEF DESCRIPTION OF THE DRAWING

The specific details of the best mode contemplated by applicant for carrying out the invention, and of the manner and process of making and using it so as to enable those skilled in the art to practice same will be described in clear concise and exact terms in conjunction with the accompanying drawings; wherein.

DESCRIPTION OF PREFERRED EMBODIMENT OF INVENTION

Figure 1:
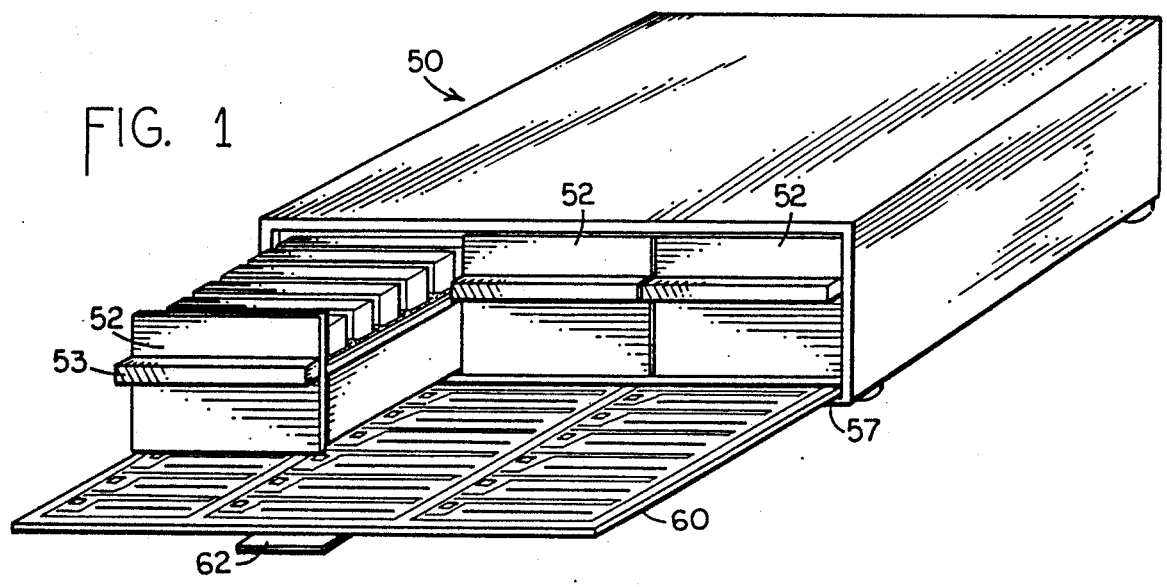
FIG. 1 is a perspective view of a cassette storage cabinet formed with a selectively exposable index plate, with the index plate extended for observation, in accordance with the invention.

Referring now more particularly to the drawings, like numerals in the various FIGS. will be employed to designate like parts.

As illustratively shown in the drawings, the storage display tray 10 as best seen in FIGS. 3–7 is formed with a plurality of substantially identical compartments 15 which as shown are formed of a configuration having a rectangular cross-section in both longitudinal and transverse cross-section.

Figure 8:
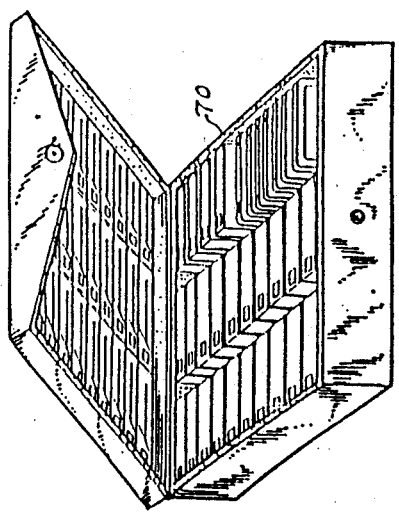
FIG. 8 is a perspective view of a cassette carrying case in which the tray of the invention is positioned, formed with a selectively exposable index of case contents in accordance with the invention.
Figure 3:
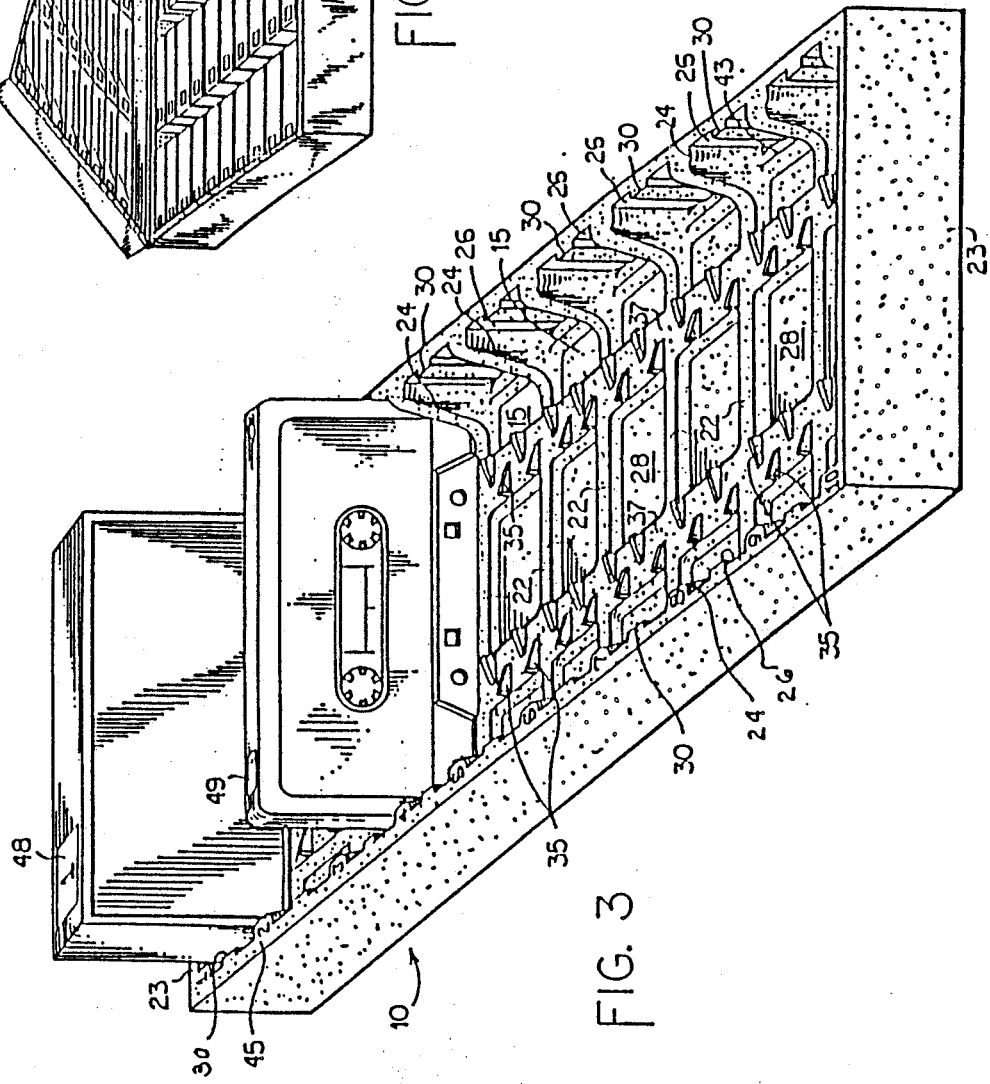
FIG. 3 is a perspective view of a storage tray made in accordance with the invention showing a boxed cassette and an unboxed cassette in position in a tray compartment.

As will be apparent to those skilled in the art the tray 10 is dimensioned to accomodate as many compartments as feasible or desired for a particular arrangement. Thus in the illustrated embodiment, the tray 10 as seen in FIG. 3 is shown as of a size suitable for insertion in a drawer of a storage cabinet as shown in FIG. 1. The tray 10 is illustratively shown in FIG. 3 as dimensioned to accomodate a row of ten cassettes each, in a tray approximately 4¾ inches by 10 inches. Alternatively it will be apparent to those skilled in the art that the tray may be formed with a plurality of side by side rows of compartments dimensioned for insertion into a carrying case of the type shown in applicant's prior patent D264,524 or in a case as shown in FIG. 8.

Figure 4:
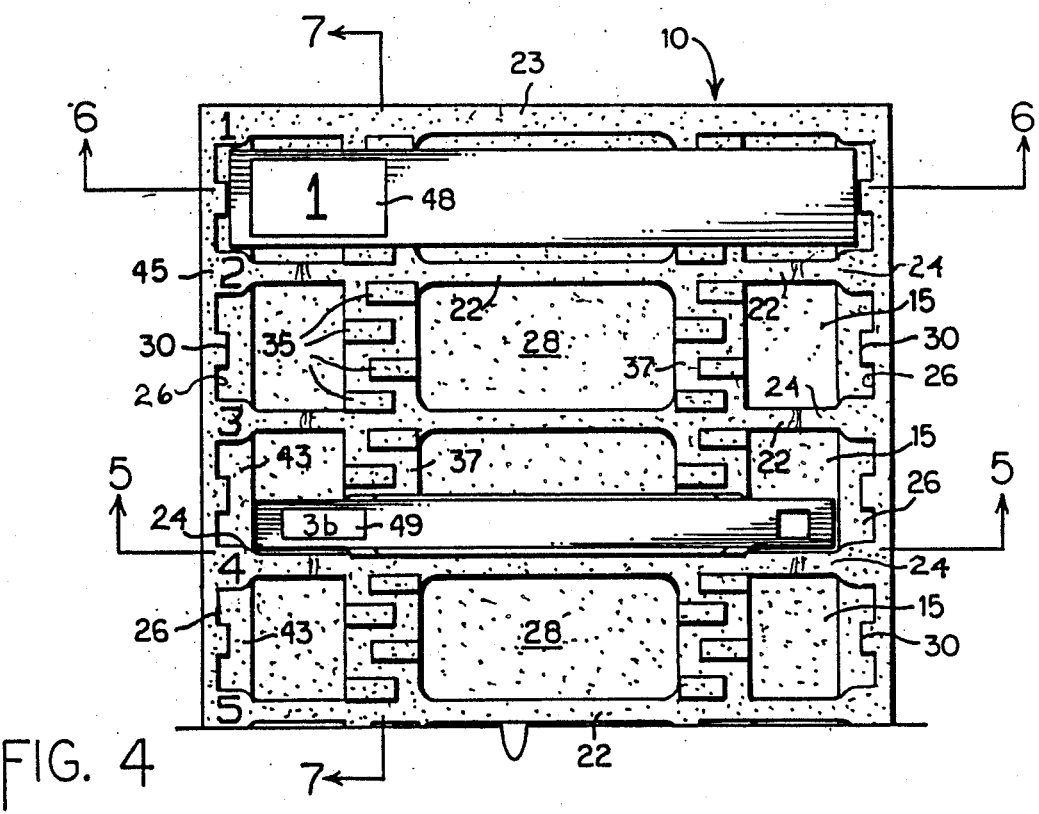
FIG. 4 is a plan view of a detail of the tray of FIG. 3 showing a top view of a boxed cassette and an unboxed cassette engaged in the tray.

Each compartment 15 is separated in tray 10 from adjacent compartments by partition flanges 24, which as best seen in FIG. 3 are arranged at equally spaced distances between tray edge walls 23 at the front and rear edges of tray 10. The spacing between the facing surfaces of the partition flanges is slightly greater than the thickness of the largest articles to be contained in the tray as is the spacing between either edge wall 23 and the adjacent facing surface of partition flange 24. Thus where the tray is formed for retention of both relatively small unboxed cassettes and relatively larger cassette boxes, the spacing between facing surfaces of adjacent longitudinally extending partition flanges 24 and edge walls 23 as best seen in FIGS. 3 and 4, will be greater than the thickness of a cassette box. Reinforcing ribs 22 extend between partition flanges 24 longitudinally of each compartment, as seen in FIG. 3.

The ends of each compartment 15 are defined by laterally extending compartment end walls 26 extending laterally with respect to the longitudinally extending partition flanges 24 and the upper surface of the bottom of the tray 10 forms a bottom wall 28 in compartments 15.

Figure 6:
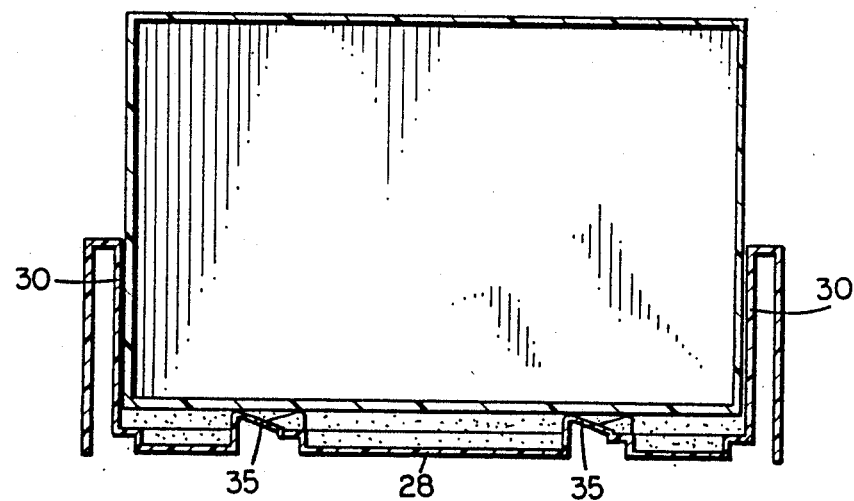
FIG. 6 is a longitudinally cross-sectional view on line 6—6 of FIG. 4 extending longitudinally through a boxed cassette showing the boxed cassette engaged in the tray.
Figure 7:
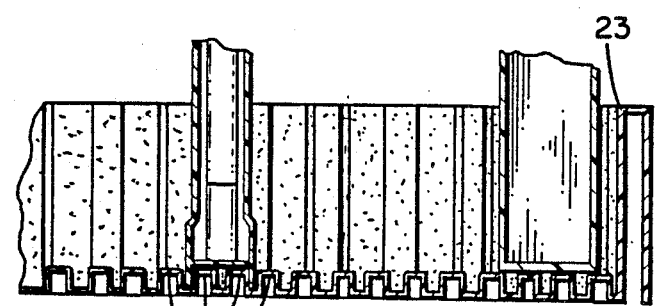
FIG. 7 is a transverse cross-sectional view on line 7—7 of FIG. 4 extending transversely through an unboxed cassette and a boxed cassette.

A rib 30 is arranged on each compartment end wall between flanges 24, each compartment having two ribs, one at each end of each compartment 15, with proximate faces on opposed ribs spaced apart a distance such as to frictionally engage the ends of a relatively large object to be retained such as a cassette box as seen in FIGS. 3 and 6.

Figure 5:
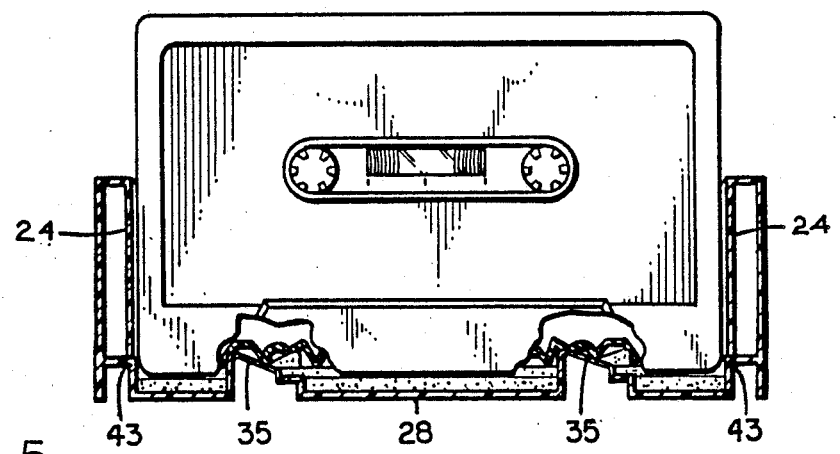
FIG. 5 is a longitudinal cross-sectional view on line 5—5 of FIG. 4 extending longitudinally through an unboxed cassette showing the unboxed cassette engaged in the tray.

Upstanding from the bottom wall 28 are a plurality of cassette pinch roller opening engaging elements 35, as best seen in FIGS. 3, 5, and 6. These engaging elements 35, as illustrated are preferrably formed in sets (two for each pinch roller opening) on a bottom reinforcing rib 37 extending transversely across the compartments 15 from the front to the back edge of the tray 10. The dimensions and positioning of engaging elements 35, as best seen in FIG. 5 is such as to permit elements 35 to extend into and frictionally engage all four sides of a cassette pinch roller opening so as to positively hold and position the unboxed cassette against transverse or lateral movement. As shown in the illustrated preferred embodiment, engaging elements 35 are of a triangular contour as viewed in front elevation, (see FIGS. 3, 5, and 6) and in the illustrated embodiment are formed as right triangles arranged in sets of two with the hypotenuses of each set sloping downwardly in opposite directions. A set of such elements 35 is provided to engage in each cassette pinch roller opening 39, with a space between the elements of each set as seen in FIG. 11 so as to accomodate any deformation of the elements 35 as they are moved into frictional engagement in the cassette pinch roller opening.

Ledge 43 extends transversely at the lower corner of each compartment acting to reinforce same.

Compartment identifying indicia 45 as best seen in FIGS. 3 and 4 are formed on the tray, a different indicium for each compartment. These indicia are placed at some point on the tray in proximity to the compartment so as to be readily visible to a user and should preferably be positioned so that they are subject to viewing even when the compartment identified by the indicia are filled. It is found preferable to select indicia from a numeric series. In the illustrated embodiment, flanges 24 are so contoured as seen in the drawings so as to provide a top surface or land on which the indicium for an adjacent compartment may be readily applied.

As best seen in FIGS. 3 and 4 relatively large labels 48 are provided for securement to the relatively large objects such as cassette boxes to be retained in the tray. Each large label 48 is formed with indicia corresponding to the indicia 45 on the compartments, with an indicium bearing label made available corresponding to each compartment.

Relatively small labels 49 are provided for securement to relatively small objects such as unboxed cassettes, to be retained. Each small label is formed with an indicium corresponding to one of the indicia on the compartments along with a sub indicium.

Labels 48 and 49 may be of any available type formed of paper, sheet plastic or the like subject to ready securement to the cassette or cassette box. The use of a pressure sensitive adhesive is found preferable on such labels.

It is preferred to use numeric indicia for the compartments and numeric color and color tint indicia for the large labels; and numeric and alphabetic as well as color and color tint indicia for the small labels. Thus the compartments will preferably be assigned numbers from a series; e.g.; 1 through 30 (corresponding to the number of available compartments) with the large labels bearing numbers, color and color tint; e.g. 1—untinted blue through 10—lightest blue tone, 11—untinted red through 20 lightest red tone, 21—untinted green through 30—lightest green tone (corresponding to the number of available compartments), with the small labels bearing numbers, letters, color and color tint; e.g.; 1a—untinted blue through 10b—lightest blue tone, 11a—untinted red through 20b—lightest red tone, 21a—untinted green through 30b—lightest green tone.

As indicated in FIG. 1 each row has a color designation on the index guide and large and small labels as well as numeric indicia on the large labels and numeric and alphabetic indicia on the small labels. Each compartment in a row has numeric indicia.

A cassette storage cabinet 50 as illustratively shown in FIG. 1 is provided. Cabinet 50 is formed of wood, plastic, metal, compositions and or composites of these, and is dimensioned to accommodate one or more drawers 52, three drawers being shown in the illustrated embodiment. The drawers 52 are preferably formed with pulls 53 to facilitate movement of the drawer in the cabinet 50. Each drawer as will be apparent to those skilled in the art is dimensioned to accommodate a tray 10 such as shown in FIG. 3 or have a tray formed as an internal part of the drawer. A slideway 57 is formed in cabinet 50 beneath the drawers 52.

Slide plate 60 as seen at the bottom in FIG. 1 is formed of relatively rigid sheet material and provided with handle 62 to implement movement thereof. Slide plate 60 is dimensioned to slide freely in case slideway 57.

Figure 2:
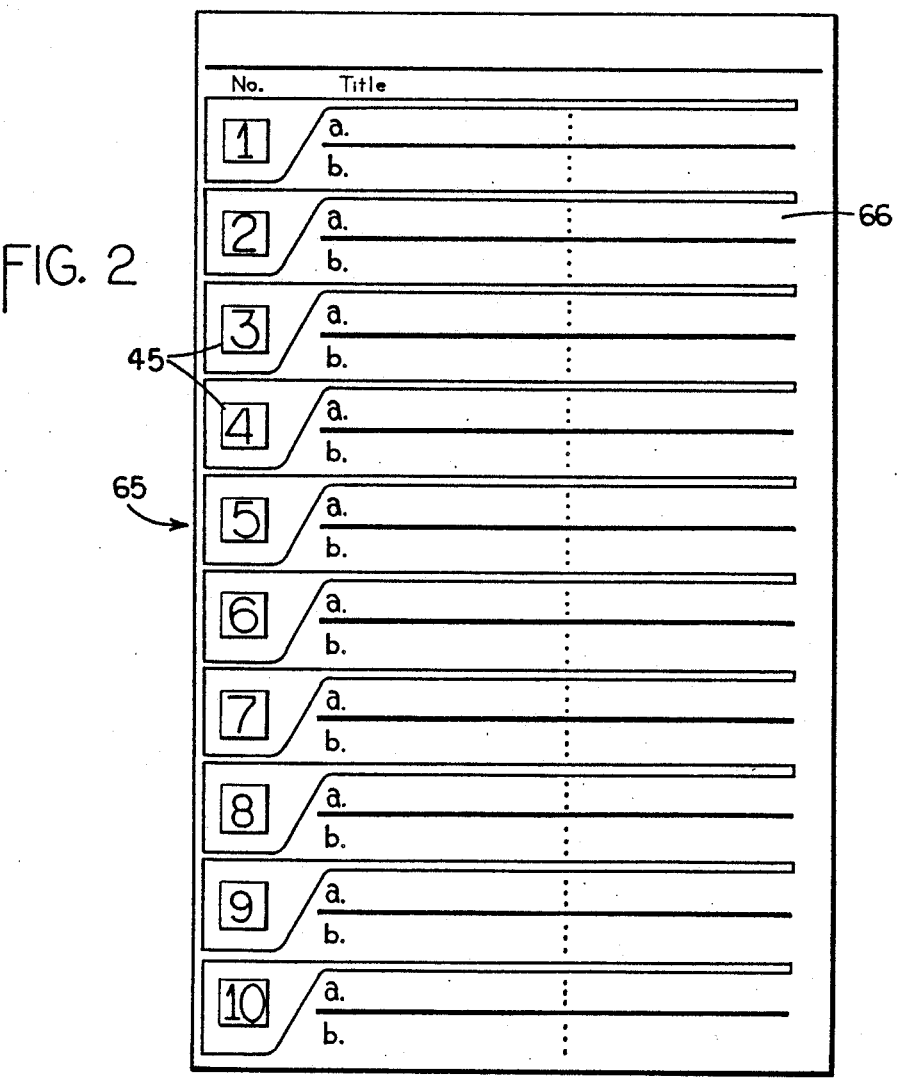
FIG. 2 is a plan view of the index employed to provide desired arrangement and retrieval of subjects stored in the tray of the invention.

Supported on plate 60 are indicia entry areas where removable index cards 65 as illustratively shown in FIG. 2 may be positioned. These index cards are formed with indicia corresponding to the indicia 45 on the tray compartments and entry areas 66 adjacent thereto where selective written entries may be made.

As shown in FIG. 8 a case 70 may be provided formed to accommodate one or more rows of cassette compartments, and the cover flap of the case is formed to hold the desired index guide.

OPERATION

In forming the above described tray it is preferred to employ conventional vacuum molding techniques for molding sheet plastics, though obviously injection molding or other shaping techniques may be employed depending on the material. According to the preferred vacuum molding production process after forming a mold having desired contours as illustrated and described, conventionally available vaccuum moldable thermoplastic sheet plastic may be molded into the desired shape. The plastic may be provided with a flocked surface at least inside the compartments. As is apparent to those skilled in the art, the tray may be used for storing and displaying a variety of different objects rectangular in cross-section.

However, as developed and disclosed the tray is primarily intended for use with conventional rectangular in cross-section audio tape cassettes boxed or unboxed. Such conventional cassettes have dimensions of approximately 4" in length, 2½" in width and 5/16" in thickness, and a thickened area of 7/16" adjacent the tape openings. The standard box for such conventional cassettes has dimensions of approximately 4⅜" in length; 2¾" in width; and ⅝" in thickness. It will however, be understood by those skilled in the art that the tray may be formed with compartments dimensioned to accommodate boxed and unboxed video cassettes and compact discs.

In use, the tray 10 may be positioned in a cassette storage cabinet 50 such as illustratively shown in FIG. 1 or case 70 as shown in FIG. 8 or may be positioned in any of a variety of other enclosures or cases or left open as desired.

Figure 9:
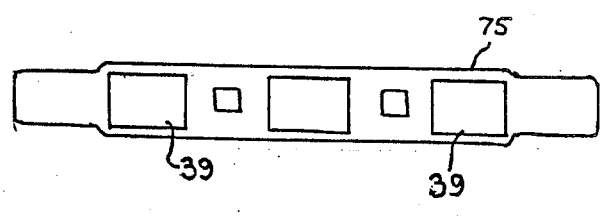
FIG. 9 is a view of the edge of a conventional cassette showing the pinch roller openings in which engaging elements on the tray are received to secure the cassette.

The compartments 15 are slightly wider (as measured in a transverse direction) than the thickness of a boxed cassette, and are preferably wide enough to accommodate two unboxed cassettes as best seen in FIG. 4. This is accomplished by forming the partition flanges 24 of a thickness such as to permit the extra width 75 as shown in FIG. 9 of the cassette at the pinch roller openings 39 of the unboxed cassette to be accommodated on the reinforcing rib 22 transitioning between flanges 24.

Thus in the illustrated tray either unboxed cassettes or boxed cassettes may be accomodated. The cassette or box is firmly held in the tray as a result of the dimensioning, shaping and spacing of the compartment components such as the partition flanges 24, ribs 30, and engaging element sets 25.

Relatively large objects such as a boxed cassette are frictionally engaged in a compartment 15 between ribs 30. Deflection of the ribs is less than that of a relatively thinner wall partition because of its greater thickness, and resulting rigidity.

The unboxed cassettes are held in place by the frictional engagement of engaging element sets 35 in the cassette pinch roller openings as best seen in FIG. 5. Since frictional engagement of the engaging elements only distorts the engaging elements themselves there is little or no distortion of the tray walls, and adjacent compartment capacity is not interfered with.

Desired arrangement of a tape collection is facilitated by the color coding of the rows of compartments and the application of indicia and color tones to the compartments, and the boxed and/or unboxed cassettes to be inserted therein as well as the index guide.

Thus by assigning and applying indicia such as a number to each compartment and corresponding indicia such as number, letter, color and tone to each cassette, boxed and/or unboxed, to be stored, replacement of the cassette in the desired position in the tray is facilitated. Since each tray compartment as disclosed holds one boxed or two unboxed cassettes the compartment section for each boxed cassette is assigned and marked with an indicium and the index guide and boxed cassette are similarly labeled. The tray compartment when used for two unboxed cassettes is assigned and marked with an indicium and the index guide and unboxed cassettes are marked with the indicium as well as sub indicia. Thus a boxed cassette labeled 2 will be replaced in compartment 2. An unboxed cassette labeled 3b will be replaced in compartment 3, section b.

The above disclosure has been given by way of illustration and elucidation and not by way of limitation and it is desired to protect all embodiments of the herein disclosed inventive concept within the scope of the appended claims.

What is claimed is:

1. A coded storage display system for boxed and unboxed cassettes, said system comprising:
    a tray having compartments for boxed and unboxed cassettes;
    compartment identifying indicia formed on the tray adjacent to each compartment;
    a relatively large label for each boxed cassette to be retained in the tray compartments bearing indicia corresponding to said compartment identifying indicia for the compartment in which the boxed cassette is to be positioned; and
    a relatively small label for each unboxed cassette to be retained bearing indicia corresponding to said identifying indicia for the compartment in which the unboxed cassette is to be positioned, whereby each compartment and compartment section may be identified as intended for receipt of a particular boxed or unboxed cassette.

2. A display tray as in claim 1 in which said indicia are color coded and color tone coded.

3. A display tray as in claim 2 in which different groups of compartments are labeled with different colors, and different compartments in each group are distinguished by different tones of the color of the group.

4. A display tray as in claim 3 in which the color tones of the compartments increase in intensity from one end of a given group of colors to the other.

* * * * *